United States Patent [19]
Hazel et al.

[11] Patent Number: 5,268,801
[45] Date of Patent: Dec. 7, 1993

[54] METHOD AND APPARATUS FOR EFFECTING DATA TRANSFER WITH HIGH PRECISION REFERENCE DATA ON A ROTATABLE STORAGE MEDIA

[75] Inventors: Robert L. Hazel, Newbury Park; Gajus Michelson, Westlake Village; William W. Valliant, Camarillo, all of Calif.

[73] Assignee: Servo Track Writer Corporation, Westlake Village, Calif.

[21] Appl. No.: 596,489

[22] Filed: Oct. 12, 1990

[51] Int. Cl.$^5$ .............................................. G11B 5/56
[52] U.S. Cl. ................................ 360/77.03; 360/72.1; 360/137
[58] Field of Search ............... 360/72.1, 77.03, 97.01, 360/137

[56] References Cited

U.S. PATENT DOCUMENTS

| | | | |
|---|---|---|---|
| 3,812,533 | 5/1974 | Kimura et al. | 360/77.08 |
| 3,875,589 | 4/1975 | Applequist et al. | 360/78.12 |
| 4,068,268 | 1/1978 | Idemoto et al. | 360/78.04 |
| 4,234,899 | 11/1980 | Feldstein et al. | 360/72.1 |
| 4,371,902 | 2/1983 | Baxter et al. | 360/75 |
| 4,414,589 | 11/1983 | Oliver et al. | 360/77.07 |
| 4,531,167 | 7/1985 | Berger | 360/77.02 |
| 4,556,964 | 12/1985 | Trethewey | 369/44.14 |
| 4,644,416 | 2/1987 | Yamada | 360/17 |
| 4,701,818 | 10/1987 | Gitzendanner | 360/106 |
| 4,831,470 | 5/1989 | Brunnett et al. | 360/75 |
| 4,870,514 | 9/1989 | Enami et al. | 360/72.1 |
| 4,920,442 | 4/1990 | Dimmick | 360/137 |
| 4,980,783 | 12/1990 | Moir et al. | 360/77.02 |

FOREIGN PATENT DOCUMENTS

| | | | |
|---|---|---|---|
| 0202480 | 11/1986 | European Pat. Off. | 360/77.07 |
| 0259039 | 3/1988 | European Pat. Off. | 360/77.11 |
| 2113449 | 8/1983 | United Kingdom . | |

OTHER PUBLICATIONS

Pertec Peripherals; Mini-Wini brochure, May 1980.
W. A. Herrington and F. E. Mueller, Quad-Burst PES System for Disk File Servo, *IBM Technical Disclosure Bulletin*, vol. 21, No. 2, dated Jul. 1978.
Patent Abstracts of Japan, vol. II, No. 49 (P-547), abstract of Japan 61-214285, publ. Sep. 9, 1986 (Toshiba Corp.).

*Primary Examiner*—Jospeh L. Dixon
*Assistant Examiner*—David L. Robertson
*Attorney, Agent, or Firm*—Merchant, Gould, Smith, Edell, Welter & Schmidt

[57] ABSTRACT

A system and method for writing reference information on a recording media contained with a sealed housing utilizes a reflective planar mirror on the rotary actuator controlling the writing mechanism. A narrow beam directed through a window on the side wall of the housing onto the mirror is reflected off at angle dependent on the actuator position to a beam sensitive detector. A translator system driven by a positioner disposed at a distance from the rotary actuator axis which is substantially greater than the distance between the actuator axis and the writing head, is used to vary the relationship between the directed and reflected beams. This system incorporates the rotary actuator in a closed loop servo that positions the actuator precisely at different locations relative to the recording medium, so that the reference information may be written.

47 Claims, 7 Drawing Sheets

METHOD AND APPARATUS FOR EFFECTING DATA TRANSFER WITH HIGH PRECISION REFERENCE DATA ON A ROTATABLE STORAGE MEDIA

BACKGROUND OF THE INVENTION

This invention relates to systems and methods for writing and reading positioning patterns on data storage systems, and particularly to systems and methods for controlling the writing or reading of precisely positioned reference data and other reference data in sealed disk drive units.

In the present state of the art pertaining to digital storage on movable media, extremely high track densities (of the order of 1000–2000 tracks per inch) have become feasible. Workers in the art have constantly sought to increase the number of usable tracks per disk, i.e. the track density, since it is intuitively recognizable that doubling the number of tracks per inch effectively doubles the amount of stored data. As track densities were increased, it was soon found that open loop systems, such as incremental positioning systems without actual head position feedback, could not meet the accuracy requirements. Such previously minor factors as thermal errors and manufacturing tolerances could not be accepted because of the very small track spacings. Consequently, developers went to embedded servo track systems, and sophisticated dedicated servo surface systems which may also be combined with some embedded servo track information. Embedded servo track systems have prewritten reference patterns among the data tracks which enable precise location of magnetic heads for writing and reading during operation. Dedicated servo surface systems have a single disk surface on which there is only recorded head position information. This information is continuously read in order to position the remaining read/write heads mounted on the common actuator. The constant quest for ever higher track densities has led to modern systems which have 2,000 to 4,000 or more tracks per inch, for magnetic media.

Some of the techniques heretofore used have written the required reference patterns by accurately positioning the head assembly by a separate apparatus which is typically not part of the final drive assembly. For example, an external rotary or linear actuator may be attached to the head assembly drive actuator. With the position of the external actuator being accurately controlled, the head assembly actuator correspondingly follows. This, however, can result in positioning inaccuracies due to various factors such as the friction in the coupling between the two actuators, the relative position of the external actuator and the servo head, and errors between the external position and actual internal head position.

A serious disadvantage is the fact that the disk drive unit must be partially disassembled in order to obtain access to the head assembly actuator, and thereafter maintained in a clean room for the servo track writing operation. A clean room is required to provide the equivalent environment of a clean sealed disk drive assembly. A purified atmosphere without particulate contaminants is needed to "fly" the magnetic head assembly at the necessary close spacing (of the order of a few microinches) to the surface of the disk. Otherwise, particulates, such as ordinary dust, appear as relatively massive objects that affect both the aerodynamics and recording.

A substantially more costly technique, but one which may be adequately precise, mounts a retroreflector assembly on the head assembly actuator, and directs reflected light to a fixed laser interferometer, which can give an extremely precise position signal for the head actuator in the form of a distance measurement to the retroreflector. Then, an external actuator can be used to position the head drive, or the head drive can be placed in a servo loop which uses the interferometer for position feedback. This expedient is, however, expensive and as usually practiced involves partial disassembly and clean room operation.

It is evident, therefore, that none of the available expedients provides a suitably low cost, high precision, method for writing position reference information on a disk storage medium, or particularly for doing so with a sealed type of drive and under conditions and with procedures suitable for mass production operations.

There are also other circumstances in which it is desired to sense or control a part of the dynamic interior mechanisms of an open or a sealed disk drive, in terms of determining where the head mechanism is, or the angular position of the disk itself, or both. In some instances in early testing of a unit, for example, it is desired to check data transfer operations at a number of specific track positions. Without a full operating system and servo information this cannot readily be accomplished, if at all, by present techniques. As a different example, the angular position of the rotating disk may be needed, again prior to or independently of, other position information without disassembly of the unit.

SUMMARY OF THE INVENTION

Systems and methods in accordance with the invention for writing and reading position reference data on a storage media employ a precision mechanical translator and a light beam reflected off a member associated with or on the media, such as part of a head drive assembly for writing on the media. The reflected beam is directed as a small area beam spot onto a precision detector associated with the translator. The geometry is arranged such that increments of movement of the translator can be substantially greater than increments of movement of the head drive assembly. By precisely locating the translator at different positions, and using an error signal derived from the detector to control the head drive assembly responsively, position information may be precisely written by the writing head at closely spaced relationships on the media.

The ability to control internal position in response to an external positioning and sensing system permits other data transfer operations to be carried out at precise locations. For example, reading and writing can be done at precise positions without use of the usual position information.

Important aspects of the invention derive from the multiplication factor obtained through use of the translator that moves through the same angle but substantially larger displacements due to the geometry than does the head drive actuator, together with minute beam cross section size, so that the position can be precisely sensed, as by a bicell detector. Very small changes in position at the translator thus generate precise signals for exact control of head position in a closed loop fashion. In a preferred arrangement, the beam is focused at an image region, and the centroid of the beam, whose area is less than the area of the detector, generates signals used in a differential manner to derive the error signal. The error signal is zero when the centroid is on the index line between the halves of the bicell and varies in a positive or negative sense dependent on the deviation from the index.

This arrangement is particularly advantageously used with a sealed magnetic disk drive having a rotary actuator for a magnetic head structure. The disk drive incorporates, at minimal additional cost, a window and a small planar mirror positioned on the actuator The light beam, such as a laser beam, is directed through the window to be reflected off the actuator onto the detector, which is movable on the translator mechanism along an arc centered on the axis of the rotary actuator. A sealed disk drive unit may therefore be mounted in position relative to the translator, and electrically coupled so that the error signal drives the rotary actuator Then position reference tracks may be written on the disk, starting with a known or a "home" position for the rotary actuator and proceeding through separate increments as defined by the translator.

It is particularly advantageous to use the light beam in an autocollimator configuration, such that the light source is disposed on the translator to form a beam along a parallel path with reflected beam to the detector, with beam splitters being utilized to guide the returned beam back to the detector. In this system, a pair of transimpedance amplifiers are coupled to the different parts of the bicell, and their signals are combined to generate the error signal which drives the rotary actuator. For convenience of control, the error signal that is generated is normalized to compensate for laser beam intensity variations. In addition a part of the laser beam is split off and directed toward a fixed reference detector to be used in generating a reference signal in compensating for beam pointing variations.

Another aspect of the invention is a sealed disk drive having a rotary actuator and characterized by a planar reflector mounted on the actuator to be pivoted in response to movement of the translator, and a light transmissive window spanning an arc that encompasses all angles of a line perpendicular to the mirror as it changes angle with the actuator between its limits of motion.

Further in accordance with the invention, the translator and detector system may be used to write position information with a data storage system that has an external rotary actuator shaft. In this instance the mirror may be removably or permanently mounted on the accessible portion of the shaft, and no window is needed.

A further feature of the invention lies in the combination of internal reflective indicia, one or more transmissive windows in the sealed housing, and the external beam generation and reflected beam sensing system to sense the operating position of internal dynamic mechanisms. The angular position of a disk can thus be sensed by providing peripheral index marks, the passage of which are remotely detected during rotation to generate control information for positioning, clocking or sector identifying purposes.

BRIEF DESCRIPTION OF THE DRAWINGS

A better understanding of the invention may be had by reference to the following description, taken in conjunction with the accompanying drawings, in which.

DETAILED DESCRIPTION OF THE INVENTION

Figure 1:
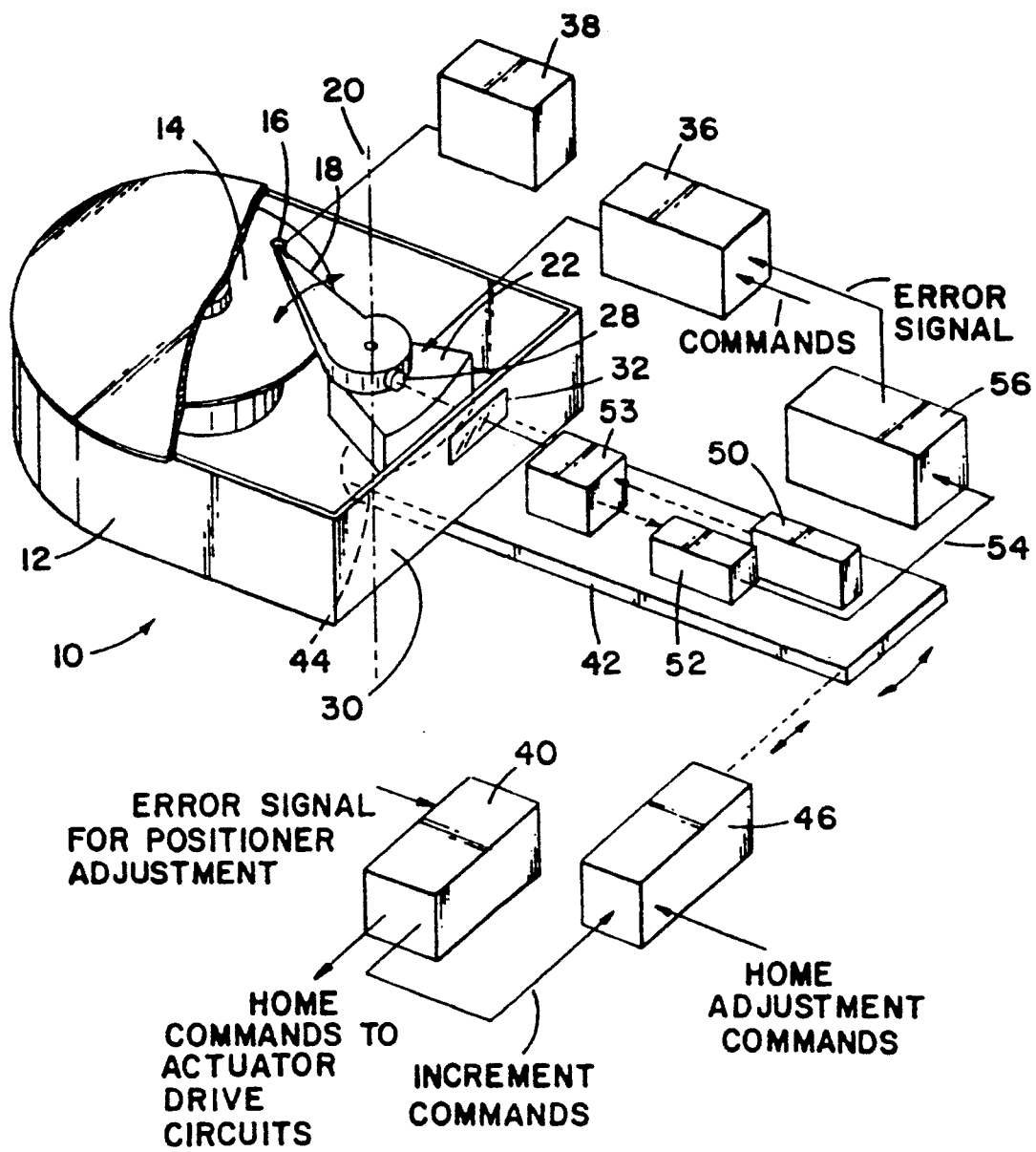
FIG. 1 is a combined perspective and block diagram view of a system in accordance with the invention.

An example of a reference pattern writing system in accordance with the invention is shown in generalized form in FIG. 1. Further details of a specific preferred version are shown, without duplication of some of the associated circuits and devices, in FIGS. 2 to 4. The examples given relate to a high density magnetic disk drive 10 of the design having a sealed housing 12 with air filtration means (not shown) for ensuring that particulates cannot intrude between the disk 14 and the closely spaced, aerodynamically supported, magnetic head 16. The head 16 is mounted on an actuator arm 18 that is pivoted about an actuator axis 20 by a drive actuator 22, such as a DC motor, a voice coil motor, a torque motor, or some other precision angular positioner. These elements and relationships are not shown in detail because they, as well as the drive spindles and motors, are well known in the art. Variants such as multiple disk assemblies should also be understood to be adaptable to use within the scope of the invention. The present specific example is directed to a 5¼" diameter disk system, but adjustment for smaller (e.g. 3½", 2½" and sub-2") and larger (e.g. 8", 9½" and 14") disk systems will be understood to require no more than routine engineering effort.

The principles and embodiments of the invention also apply to optoelectronic disk memories, where these are to be used without prewritten or pre-embedded reference patterns. Most current optoelectronic memories incorporate physical reference patterns, but as new electrooptic media come into use this approach may not always be feasible or desirable.

The actuator arm 18 serves as the base for receiving a small planar mirror 28, mounted on the side of the base portion of the arm 18 so as to be approximately tangential to a circumference about the actuator axis 20, at a short radius from that axis. Also, the disk drive 10 is further modified by incorporation, in one wall 30 of the housing 12, of a small transparent window 32. The window 32 spans the arc which a line perpendicular to the plane of the mirror 28 traverses between the limits of movement of the actuator arm 18 as it moves between the innermost and outermost (or vice versa) tracks on the disk 14. The window 32 is joined to the sealed housing 12 so as to maintain the internally clean environment, and sealants or gaskets may be used to ensure against leakage if desired. Although the window 32 may be curved about the actuator axis 20, it is shown below that a planar window 32 does not introduce an unacceptable level of error, and thus a flat element is preferred for cost reasons. In any event the mirror 28 and window 32 add only a minimal increment of cost to the disk drive 10, and constitute the only modifications to the drive mechanical configuration. The mirror 28 is attached to the actuator arm 18 so as to bisect the axis 20 (if on the axis) or, more usually, on the side of the arm 18 tangential to a circumference about the axis 20. The window 32 spans an arc that encompasses a beam path perpendicular to the plane of the mirror 28 as the actuator 18 moves through its range of travel.

To the disk drive 10 can be added an actuator drive circuit 36 which operates in response to external commands and to internal servo information to move the actuator. The resident drive circuits of the disk drive 10 can be used but this is not preferred if they are not designed to accommodate the external error signal requirements. The drive 10 also incorporates means for defining a known track position, such as a "home" track position at one limit of the recording area. Read/write circuits 38 may incorporate internal means for writing and reading timing information and/or servo pattern signals that are to be applied from an external signal generation source (not shown). Further details are not given because timing signals are not used with all reference patterns, because a dedicated clock head can be used, and because various other expedients are available for writing timing data and servo patterns. These include the use of peripheral index marks, independently sensed through the window, on the disk in the fashion shown in FIGS. 7(a) and 7(b) and described below. They also include a system which does not require the use of indicia, such as that described by Martyn Lewis in a U.S. patent application filed concurrently herewith.

The reference pattern writing system in accordance with the invention also includes control circuits 40 which provide a "home" command to the actuator drive circuits 36 for initializing operations, and increment commands for thereafter selecting successively spaced apart reference positions for a mechanical translator 42 external to the disk drive 10. The mechanical translator 42 is mounted to pivot on a translator shaft 44 approximately collinear with the actuator axis 20, so that light beam devices on the translator 42 move in a plane normal to the actuator axis at constant radii from the axis 20.

Figure 4:
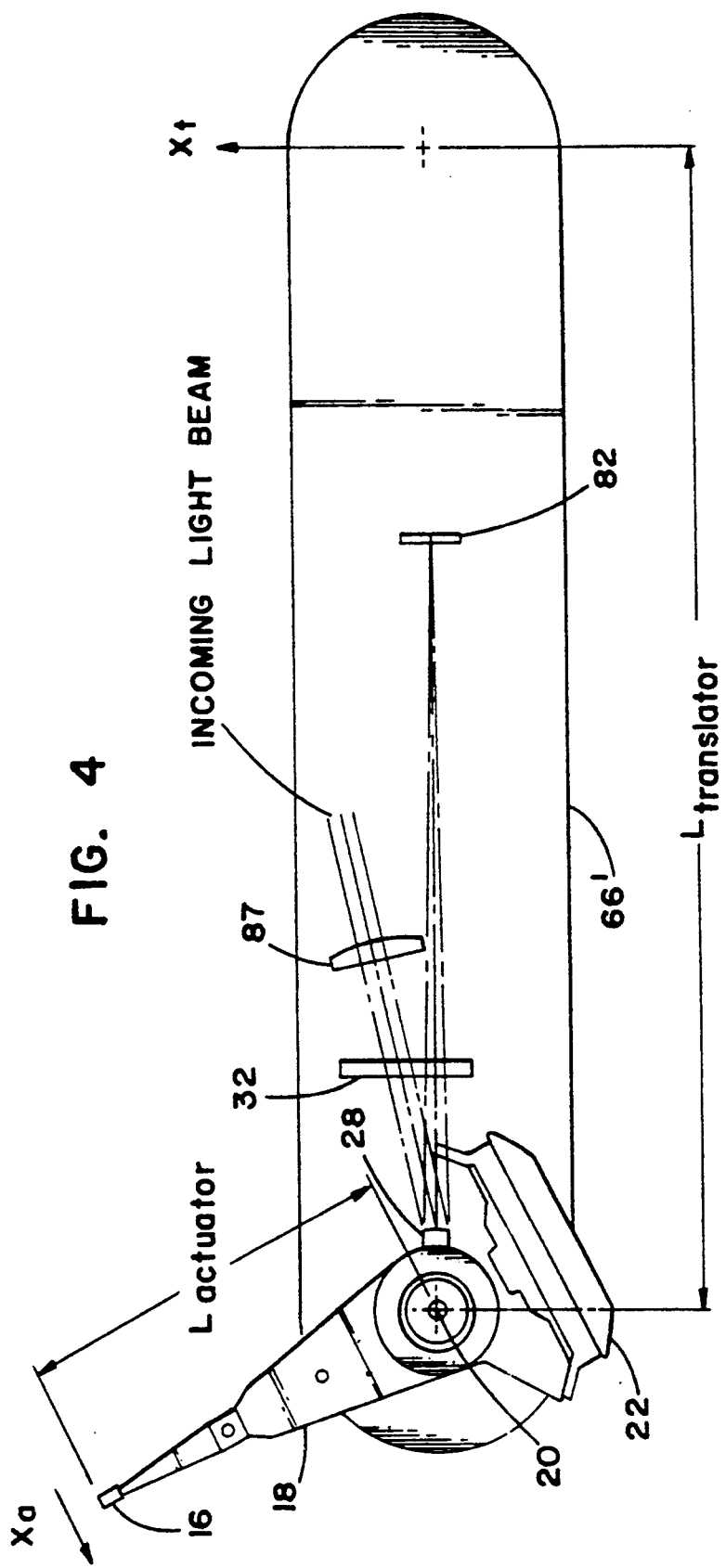
FIG. 4 depicts more specific details of a beam focusing path, slightly modified for clarity, that may be utilized in the arrangement of FIGS. 2 and 3.

The arm length of the translator 42 (sometimes $L_{translator}$ hereafter) is at a distance from the axis 20 that is substantially greater than the arm length ($L_{actuator}$) between the axis 20 and the recording head gap on the magnetic head 16. Referring briefly to FIG. 4, this relationship is shown, although not to scale.

Referring again to FIG. 1, the circumferential arc of movement of any point on the translator 42 about the axis 20 corresponds to the arc described by a line perpendicular to the planar mirror 28. The translator 42 is shifted in position by an electromechanical positioner 46, operating in response to control circuit 40 commands. With the rotary arm 18 in the "home" position, however, the positioner 46 receives error signals so that the translator 42 may be driven to a corresponding start position from which track writing can begin. This is to say that the translator 42 is driven to "find" the beam reflected by the arm 18 in its home position. This initialization of the translator 42 is effected by the control circuits 40 in response to error signals generated as described below. The control circuits 40 may comprise a microprocessor or firmware for providing the two basic commands needed for positioner 46 operation.

Either one or both of two light beam devices, namely a light beam source 50 and a beam position detector 52, are mounted on the translator 42. When both are movable with the translator 42 the unit functions as a single plane autocollimator 54, with a projected light beam from the source 50 being reflected off the mirror on the arm 18 inside the housing 12, and the reflected beam being parallel to the projected beam when the system is adjusted to a stable position. However, in alternative configurations either the light beam source 50 or the beam position detector 52 may be fixed, with the other element 50 or 52 being mounted on and moving with the translator 42. The autocollimator version is generally preferred because it allows certain corrections to be made for higher resolution, because the length of arc is smaller by a factor of two, and the window 32 can therefore also be smaller.

The light beam source 50 can be any light source suitable for directing a small beam spot on the detector 52, but for cost and performance reasons a semiconductor laser is generally used. An optics system 53 is used to separate the direct and reflected beams and establish the desired small beam spot size at the object plane. The pattern of a laser beam spot has a generally Gaussian distribution and is elliptical in outline, but the beam centroid does not change (unless the beam direction shifts) because these factors are constant. The beam position detector 52 has an area larger than the beam spot size, and a configuration to provide a signal that varies with beam position on the detector. Thus the detector may comprise a linear array of elements, a two-dimensional array of elements, or a single device with variable amplitude response, such as a lateral cell. Preferably, however, the detector 52 comprises a bicell unit in which two adjacent detector cells abut at an intermediate index line or area which defines the desired position for the beam centroid when the rotary actuator is in stable operation at a selected position.

The signals generated by the detector 52 are converted into an error signal by error signal generating circuits 56, including typical preamplifier and signal compensation means, and coupled to the actuator drive circuits 36.

This system in accordance with the invention thus employs the translator 42 as a remote position reference for placing the magnetic head 16 at chosen radial positions, very precisely determined, relative to the disk 14. The rotary actuator arm 18 real time position is represented by the reflected light beam direction off the mirror 28, because the light beam from the source 50 in any event impinges off the mirror 28 through the window 32, and then reflects back through the window 32 onto the detector 52. Because the arm length at which translator 42 adjustments are made is substantially greater than the actuator arm length to the magnetic head 16, there is a corresponding advantage in positional accuracy. This is augmented by high gain resulting from very small beam size and high detector sensitivity. With a beam spot size of 54 $\mu$m and a mechanical arm advantage of about 7 ($L_{translator}$) to 1 ($L_{actuator}$), for example, the position of the magnetic head 16 can be easily controlled to within ±5 microinches. This is a sufficiently precise control to enable approximately 4,000 reference patterns per inch to be written on the disk 14. Greater density in writing reference patterns can be provided by further increasing the mechanical advantage and adjustments in the optical path.

This capability is achieved without any more than the two minor structural additions to the sealed disk drive 10, and by a mechanical and optical mechanism that is entirely external to the sealed disk drive 10. Thus there is no need for disassembly of the unit, hence clean room conditions are not a prerequisite to writing the patterns. The disk drive 10, manufactured by mass production methods, need only be placed on a suitable fixture so that the actuator axis 20 is properly aligned. Then with the actuator arm 18 commanded to the home position, the translator 42 is correspondingly placed at a start position. Thereafter, incrementing the translator 42 causes the rotary actuator to be located at the chosen track positions on the disk. At each position, once the actuator arm 18 has stabilized with the magnetic head 16 at the radius defined by the translator 42, the reference patterns can be written using read/write circuits 38.

To fully realize the potential of this concept, however, advantage must be taken of it to correct for certain practical problems concomitant to low cost light beam sources and optical elements. Semiconductor lasers do not typically generate beams of constant uniformity and directionality. The attenuation of beam power as it traverses the optical path may also vary. These factors can adversely affect magnetic head positioning accuracy. Also consideration must be given to possible beam distortion introduced by the window and manufacturing tolerances as to placement of mechanical elements.

Figure 2:
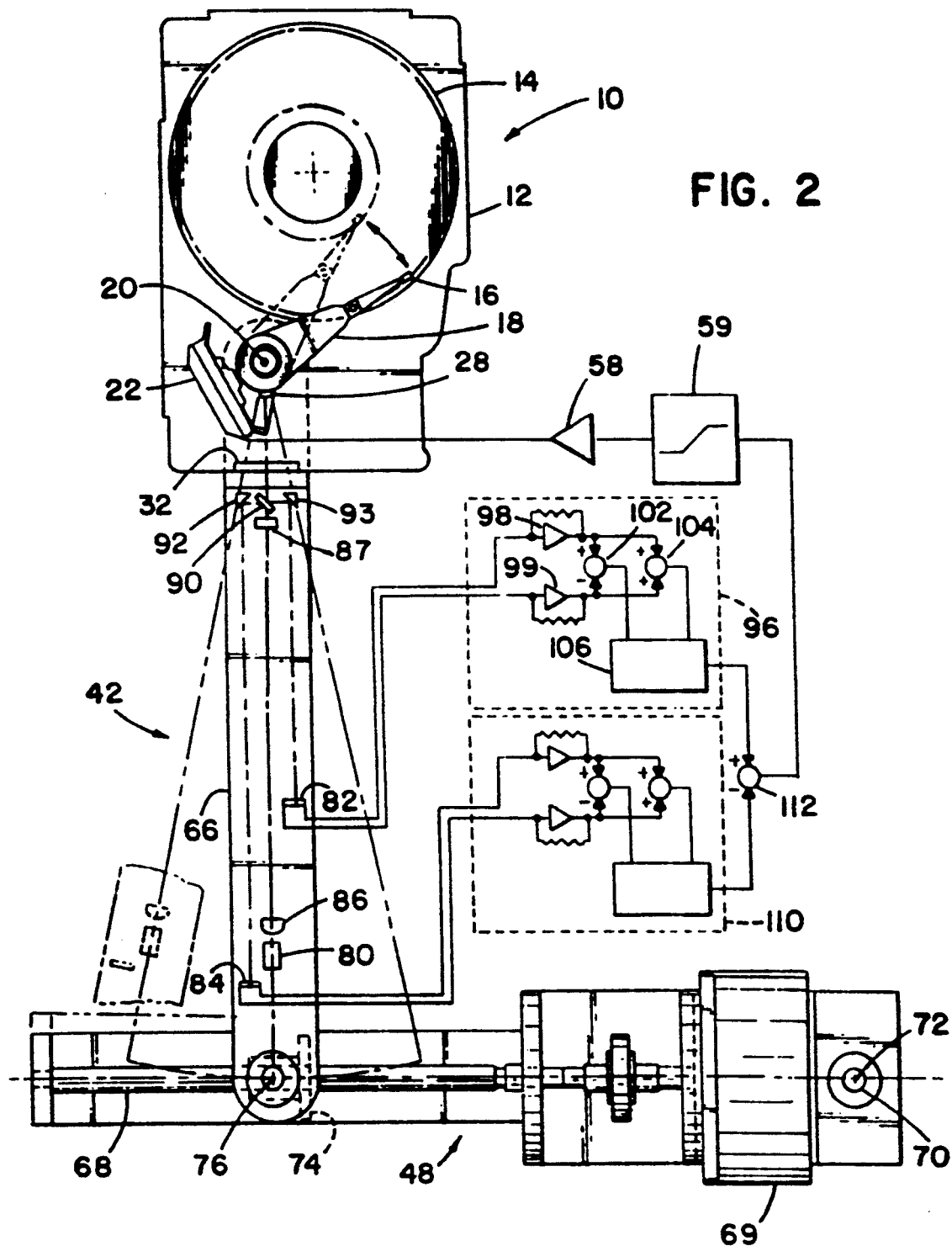
FIG. 2 is a plan view of a more specific example of mechanism, optical path and error signal generating circuits in the arrangement of FIG. 1.
Figure 3:
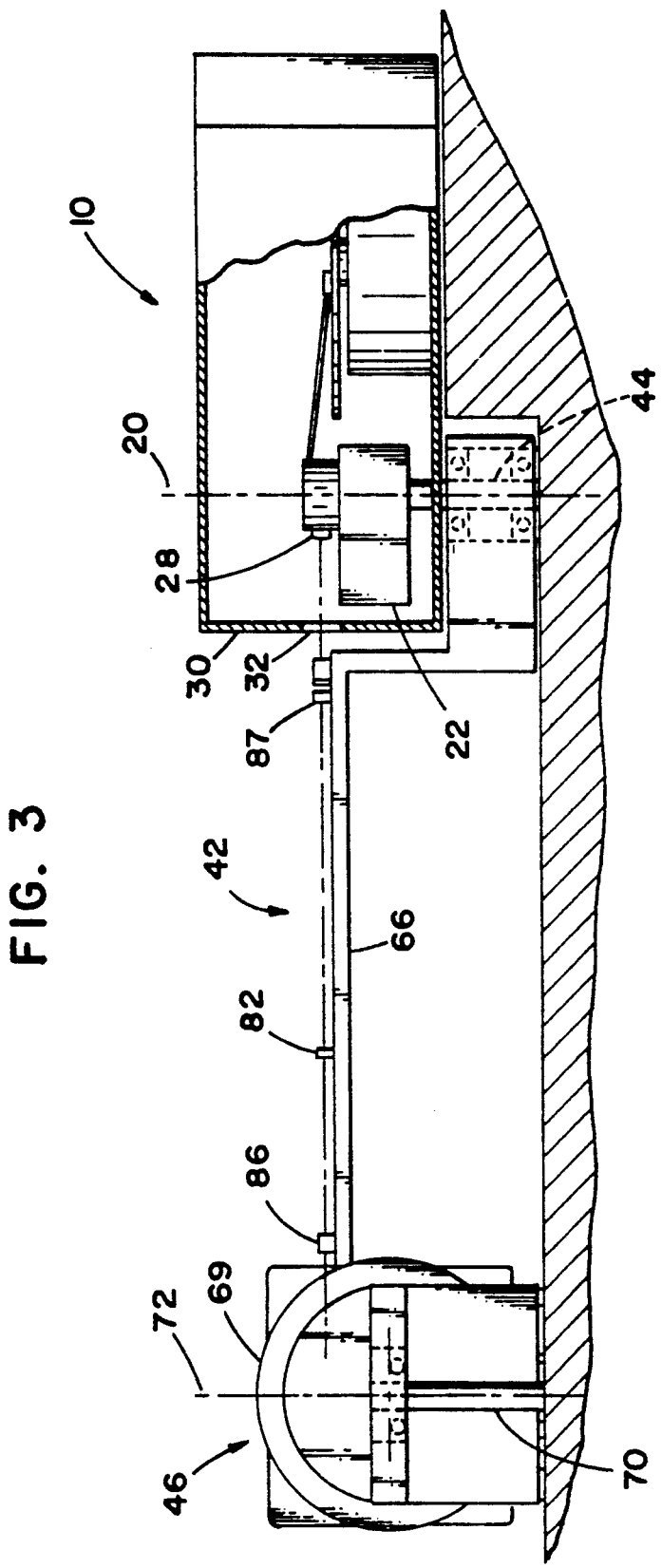
FIG. 3 is a side view of the system of FIG. 2.

The system of FIGS. 2 and 3 is a practical implementation of the configuration of FIG. 1, with extension of the autocollimator technique. The translator 42 comprises an arm 66 mounted to pivot approximately about the actuator axis 20 as in FIG. 1. The structure to which the arm 66 is attached includes reference points or, not shown, surfaces against which the disk drive 10 may be indexed. These references may comprise registration holes or pins built into the bottom or sides of the housing 12 or reference surface, or a combination of such features. These may be used to locate the disk drive relative to the structure to which the translator 42 is attached. The positioner 46 comprises a transverse lead screw drive 68 turned by a microstepper 69 and mounted to pivot on a shaft 70 about a positioner reference axis 72 that is parallel to the actuator axis 20. Variations in the length of increments at the translator 42 may be desirable to assure equal increments of movement at the head 16. However, this variation is dependent on angle in wholly predictable fashion and the increments may thus be adjusted in predetermined fashion by the controller circuits 40. An additional pivot 76 is provided between the lead screw nut 74 driven by the lead screw 68 and the translator arm 66 which accommodates changes in the angular relationship between the translator 42 and the positioner 46 as the translator arm 66 moves arcuately through its range.

In this example the light beam source comprises a semiconductor diode laser 80 pointed toward the mirror 28 on the actuator 18, through the window 32. On each side of the laser beam path, facing in a parallel direction, are separate detectors, consisting of a position feedback detector bicell 82 (hereinafter the feedback bicell) and a beam direction detector bicell 84 (hereinafter the direction bicell). The beam from the laser 80 is passed through a collimating lens 86 and a focusing lens 87, to a beam splitter 90 angled at a 45° angle to the beam path.

A portion of the incident beam, a reference beam, is deflected off to a corner reflector 92 into a reverse but parallel path to the direction bicell 84. The remaining portion of the incident beam proceeds through the beam splitter 90 and the window 32 and after reflection off the mirror 28 on the actuator 18, returns to be reflected off the beam splitter 90 to a second corner reflector 93, and then along a second parallel but reverse path to the feedback bicell 82. If there is beam directional instability due to the laser 80 it is present both in the reference beam and the feedback beam and correspondingly varying signals are derived at the feedback bicell 82 and direction bicell 84, to be used as hereafter described.

The two currents from the feedback bicell 82 are applied to an arm position detector circuit 96 within the error signal generating circuits 56. The two currents are separately amplified in first and second transimpedance amplifiers 98, 99 respectively, and their difference is derived at a first difference junction 102, while their sum is derived at a summing junction 104. The difference signal, which represents the basic error signal but which may drift with variations in beam intensity, is thus adjusted to a suitable higher or lower normalized level by a conventional normalizer circuit 106 by using the summed amplitude of the two signals as a reference. Like circuits may be utilized in the beam direction circuit 110, which derives the two outputs from the direction bicell 84, and which then generates a normalized error signal output which is differentially combined at a second difference circuit 112 with the error signal output from the detector circuit 96, and the resultant signal is applied to an amplifier 58 via a compensation circuit 59 performing accepted control system functions.

A number of expedients aid in optimizing the performance of this system. For example, recognizing the elliptical character of the beam from the laser 80, the long dimension of the focused beam spot is parallel to the index line dividing the bicell, by proper orientation of the laser. The divergent light beam from the laser is, after formation into a collimated beam by the first lens 86, focused by the second lens 87 in a region close to the window 32. The shorter the focal length of the focusing lens 87, the smaller the beam size at the feedback bicell 82. In a practical example the laser 80 beam diverges, and the first lens 86 provides a collimated beam of 4.6 mm which is focused by the second lens 87 into the feedback bicell 82 to have a 54 μm diameter in the long dimension. For a 5¼" disk drive unit, a practical example of the length relationships is 3" (76 mm) for the rotary arm distance from pivot axis to magnetic head recording gap, and 8" (203 mm) beam length to the feedback bicell 82 was selected. Under these conditions, a 1 microinch (0.0254 micron) displacement at the head gap is equivalent to a spot motion of 0.12% of the beam diameter, which with amplifier gain provides a significant error signal, hence the system has adequate static performance to achieve accurate positioning. The ideal situation during the pattern writing process is for the actuator to be "locked" in position so as not to have any error contributions from the actuator positioning system present in the written patterns. While it is not practical to "lock" the actuator, an actuator control with a high gain bandwidth product will approximate this condition. The present example provides a position control system with an open loop crossover frequency of over 500 Hz which provides adequate dynamic performance to achieve the very high desired accuracies.

This may be better appreciated by reference to FIG. 4, in which the incoming light path from the collimating lens 86 is shown in simplified form, and directed through the focusing lens 87 in the window 32 onto the planar mirror 28. The beam reflected back onto the feedback bicell 82 is controlled at an arm length, $L_{translator}$, which is relatively long with respect to the distance between the actuator axis and the recording head gap, $L_{actuator}$. In this Figure, the incoming beam is shown at an angle relative to the outgoing beam, rather than parallel, solely for purposes of clarity. The focal length and position of the lens 87 are chosen such that the focal plane coincides with the surface of the feedback bicell 82. Because the diffraction limited spot size is smaller with a smaller focal length, the feedback bicell 82 can be placed relatively close to the window 32, but practical consideration limit this spacing. The mechanical advantage is greater with a higher ratio between $L_{translator}/L_{actuator}$, and while 6:1 to 7:1 ratios are used in the present example, different ratios can be used if desired. Analysis of noise factors and system sensitivity, however, establishes that, as desired, a minute variation at the recording gap results in a significant signal derived at the error signal generating circuits to enable precise actuator control.

Two other factors are possible sources of error, but upon analysis, are seen to be inconsequential. The spherical aberration effect introduced by the window 32 is minimal, but an astigmatism that varies with the angle of incidence of the beam on the window is also introduced. However, this effect introduces defocusing which is an order of magnitude smaller than the beam spot size (54 microns) so that these aberrations are insignificant. Similarly, consideration has been given to the effects of possible misalignment of the translator axis relative to the actuator axis, and differences in placement of the mirror on the rotary actuator While such errors can have a small influence on beam spot size, and upon the optical path length, there is no effect on the relationship between the optical platform angle and the actuator angle. Consequently, when the optics are initially aligned relative to the home position of the rotary actuator, such errors are automatically cancelled. The maximum allowable pivot plus mirror displacement along the optical axis, and the perpendicular misalignment, are in the low millimeter range, which is well within manufacturing tolerances.

The capability for external control of the internal rotary actuator afforded by the system of FIGS. 1-4 enables other types of data transfer to take place, with or without position information. After assembling a disk drive and before or after the drive is sealed, for example, the system can be used to position the head assembly at different track locations for reading or writing purposes, or both.

Figure 5:
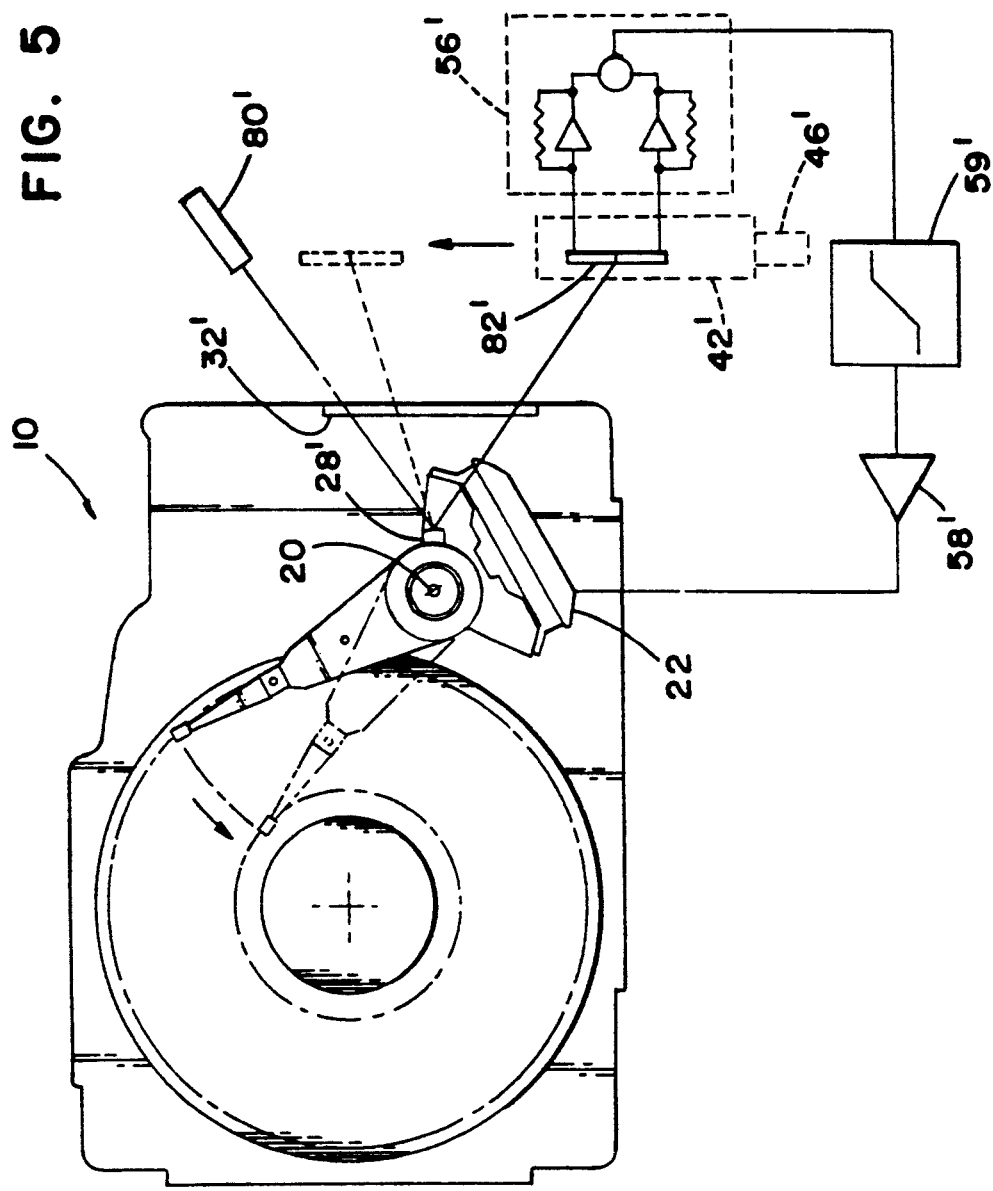
FIG. 5 is a different example of a different form of reference pattern writing system in accordance with the invention.

FIG. 5 depicts a system that has the basic advantages of the concept, but involves different design tradeoffs. The mirror 28' and window 32' are incorporated in the drive unit 10,, as previously described. However, the light source comprises a fixed laser 80', which, together with collimating and focusing lenses (not shown) is disposed to direct a light beam onto the mirror 28', for deflection out to a feedback bicell 82'. The feedback bicell 82, is on a translator 42' moved by a positioner 46', either linearly (with corrections) or in an arc about the actuator axis. Error signal generating circuits, including a compensation circuit 59', and a power amplifier 58', are utilized to energize the actuator drive and to control magnetic head position. The advantages include a simpler optical system and a double angle beam deviation with translator 42' position The result is that the system has double the beam sensitivity at the cost of a larger window.

Figure 6:
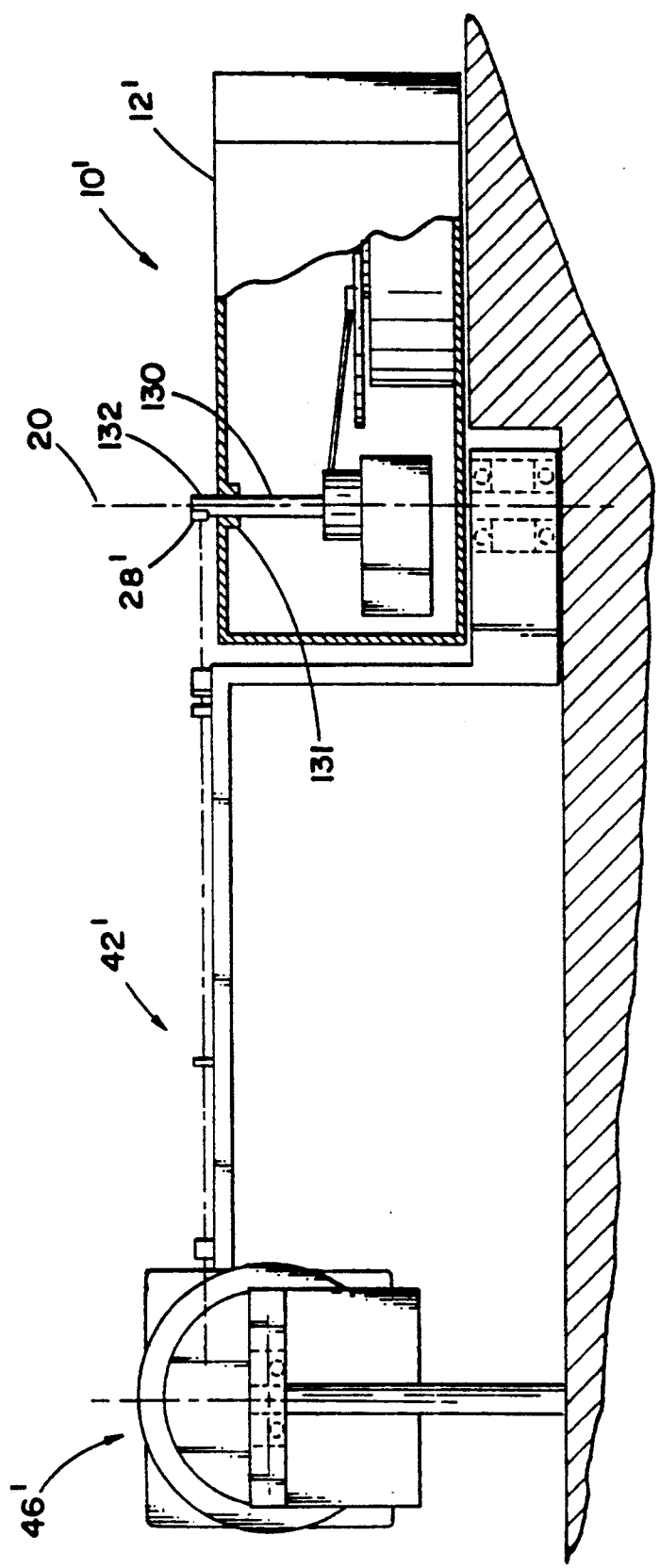
FIG. 6 is a perspective and generalized view of essential features of a system for controlling the writing of position information in a disk drive that has an externally accessible shaft for actuator control.

As seen in FIG. 6, systems and methods in accordance with the invention may also be utilized in a combination that does not require an internal mirror or adjacent window. The rotary actuator internal to the disk drive 10' has a shaft 130 that extends through a sealed bearing 131 to an end outside the housing 12', so that its mechanical angular position is available outside the housing 12'. The angular position of the shaft 130 is directly indicative of the arm and head positions. Consequently, a mirror 28' may be temporarily attached by a fixture 132, such as a magnetic or threaded element, to the shaft 130 end. The mirror 28' can bisect the central axis of the actuator shaft, or it can be at a radius, but in each instance the plane of the mirror should be parallel to the axis. While the mirror 28' can obviously be adjusted by trial and error, an alignment unit (not shown) may be used to place the mirror 28' at a precise angle when the actuator is in a predetermined position, such as at the "home" stop. Preferably, however, an index slot (not shown) will be incorporated in the shaft 130 transverse to the actuator axis, so as to enable the fixture 132 to seat itself with the mirror 28' at a precise angular orientation. It should be noted that the shaft 130 need not extend flush with the housing wall but can be below it, as long as the mirror 28' can receive the beam. The bearing seal 131 can be assured by a replaceable cover (not shown) which further protects against leakage into the housing interior.

With this arrangement, the disk drive 10' with attached external fixture 132 and mirror 28' on the shaft 130 is seated on a holder so as to be in the path of the focused laser beam from the translator 42' and positioner 46' system Initialization and incrementing, with writing of position reference information at each position, thus proceeds as previously described. When writing is complete the fixture 132 and mirror 28' are removed from the shaft 130 and the disk drive 10' is ready for data transfer operations.

Figure 7A:
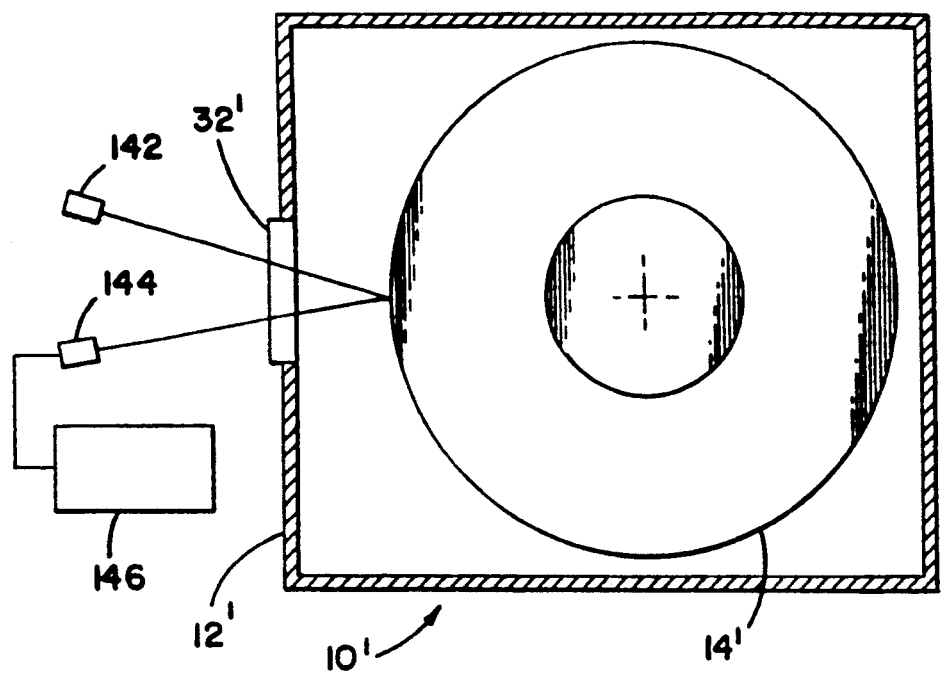
FIG. 7(a) and FIG. 7(b) and a plan and side views respectively view of a different arrangement, showing how angular position of a rotating member within a sealed housing may be remotely detected.
Figure 7B:
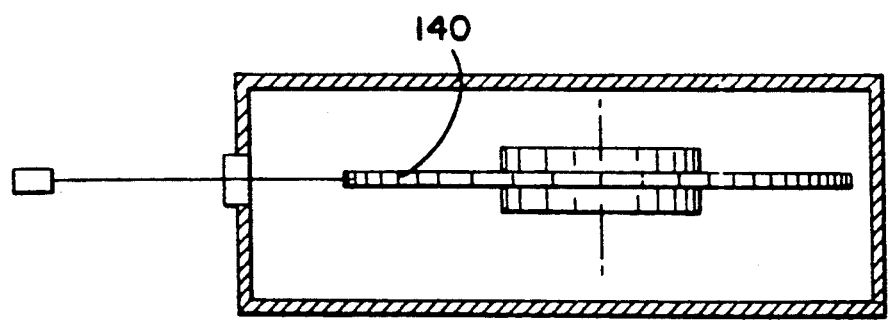

A feature of the invention is that the capability for externally sensing an internal position can be used in other modes as well. As seen in FIGS. 7(a) and (b), a disk 14' in a sealed disk drive 10' may be manufactured with precisely scribed index marks 140 on its periphery. A window 32' in the housing wall 12' is in line with the periphery, so that a beam from a fixed laser 142 passes through the window 32' to be reflected back out to a detector cell 144. With a number of approximately equally spaced index marks 140, the cell 144 generates a train of pulses at a given periodicity. These are applied to processor circuits 146 which then generate timing, clocking or velocity control signals as desired. In accordance with known techniques, for example, a high frequency train of clock signals is synchronized to the index pulses. The system therefore provides an accurate means of identifying the instantaneous angular position of the disk.

While there have been described above and illustrated in the drawings various forms and alternatives in accordance with the invention, it will be appreciated that the invention is not limited thereto but encompasses all modifications in accordance with the scope of the appended claims.

What is claimed is:

1. A system for data transfer with a read-write medium rotatable about a central axis and including an angularly movable actuator mechanism supporting transducer means, comprising:
   reflector means mounted on the actuator and movable therewith;
   means for directing a light beam against the reflector means to provide a reflected beam at an angular direction dependent on actuator position;
   means for sensing the direction of the reflected beam relative to a reference position at a distance separated from the actuator;
   means responsive to the means for sensing for controlling the actuator to cause the reflected beam to have a selected relation to the reference position such that the transducer means can effect data transfer; and
   means coupled to the means for sensing for translating the reference position to different locations.

2. A system as set forth in claim 1 above, wherein the movement of the means for translating is substantially greater, for each change of reference position, than the corresponding change of position of the writing means with controlled movement of the actuator.

3. A system as set forth in claim 2 above, wherein the system includes an actuator shaft end, and wherein the reflector means is coupled to the shaft end.

4. A system as set forth in claim 3 above, wherein the system further includes a sealed housing with respect to which the actuator end is externally accessible and the reflector means comprises a removable fixture attachable to the shaft end, and a planar mirror mounted in a plane parallel to the actuator axis of rotation.

5. A system as set forth in claim 2 above, wherein the system further includes a sealed housing encompassing the read-write medium and the movable actuator, and the housing includes window means transparent to the light beam and in the paths of both the directed light beam and the reflected light beam.

6. A system as set forth in claim 5 above, wherein the reflector means comprises a planar reflector, the means for sensing comprises adjacent sensors with an intermediate index line, and the means for directing comprises means for forming a beam of small cross section at the means for sensing.

7. A system as set forth in claim 6 above, wherein the actuator is a rotary actuator and turns about a pivot axis, wherein the means for translating moves along a curved path at a radius from the pivot axis, and wherein the means for directing a light beam is mounted on the means for translating in a position such that the light beam and reflected beam are parallel when the actuator is in a desired relationship to the reference position.

8. A system for storing data on magnetic disks in an enclosed sealed disk drive having a rotary head actuator of a chosen operating length comprising:
   a planar reflector mounted on the actuator and movable therewith about the actuator axis;
   window means in the disk drive in a position allowing travel of a light beam to the reflector bidirectionally to and from the disk drive exterior;
   light beam means positioned to direct the light beam through the window means to be reflected off the planar reflector at an angle dependent on the rotary actuator position;
   translator means exterior to the disk drive and in the path of the reflector beam and including detector means for generating an error signal representing the difference between the actual actuator position and a desired position;
   means responsive to the error signal for positioning the rotary actuator to transfer data; and
   means for incrementally changing the position of the translator means to impel changes of actuator position.

9. A system as set froth in claim 8 above, wherein the translator means includes means for moving in an arc at a radius centered approximately on the rotational axis of the rotary actuator.

10. A system as set forth in claim 8 above, wherein the light beam means and the detector means are mounted on the translator means along collinear axes.

11. A system as set forth in claim 10 above, wherein the system further comprises means for normalizing the signal output from the detector means.

12. A system as set forth in claim 11 above, wherein the system further comprises means for splitting the light beam into separate paths, at least one being a first fixed reference path and another a position sensing path, and means responsive to the signals in the first reference path and position sensing path for correcting for beam direction variations.

13. A system for storing data on a magnetic disk within a sealed housing of a hard disk assembly (HDA) having a rotational head positioning actuator, comprising:
   a planar reflector mounted on the actuator and pivotable therewith about the axis of the actuator;
   light transmissive window means disposed in the housing of the HDA;
   optical means exterior to the HDA to sense the angle of the actuator, said optical means comprising light beam means and sensor means exterior to the housing, the light beam means being directed toward the reflector and the sensor means being responsive to light reflected therefrom;
   translator means supporting the sensor means exterior to the HDA for moving the sensor means along a path spaced apart from the actuator axis;
   means responsive to the sensor means to change the position of the translator means; and
   means for changing the position of the actuator in response to the sensor means to transfer data to and from the disk.

14. The invention as set forth in claim 13 above, wherein the sensor means comprises means for generating a position error signal and wherein the translator means moves the sensor means in an arc about the actuator axis, and wherein the actuator position is controlled in response to the error signal.

15. The invention as set forth in claim 14 above, including means for normalizing the output of the error signal, comprising difference sensing means responsive to the reflected beam for generating an error signal representative of deviation from a reference position, and means responsive to the sum of the difference signals for adjusting the error signal.

16. The invention as set forth in claim 15 above, including means for compensating the light beam for errors in direction relative to a reference position, comprising means for sensing deviation of the beam from a reference position, and means responsive to the sensed deviation for compensating for the light beam position.

17. The invention as set forth in claim 13 above, wherein the light beam means and the sensor means are mounted in fixed relation to each other on the translator means, and the directed and reflected light beams are substantially collinear along their principal paths.

18. The invention as set forth in claim 17 above, further including beam splitter means mounted along the principal path and wherein the sensor means is positioned to receive reflected light split off by the beam splitter means.

19. The invention as set forth in claim 13 above, wherein the distance between the light beam reflector and the means for changing the position of the actuator is substantially greater than the distance between the axis of rotation of the actuator and the head thereon for writing position information.

20. The method of effecting data transfer at selected locations on a disk using the actuator for the transducer on a disk drive comprising the steps of:
providing a positional reference at a point spaced apart from the actuator, the position of the reference being changeable in increments proportioned to desired changes and position of the actuator for the transducer;
directing a light beam off a surface responsive to actuator position to provide a reflected light beam whose direction varies in accordance with the actuator position;
sensing the direction of the reflected light beam relative to the position of the reference;
changing the position of the actuator in accordance with the sensed position of the reflected light beam to a position determined by the position of the reference; and
effecting data transfer on the side with the transducer while holding the actuator at the selected position.

21. The method as set forth in claim 20 above, including the step of directing the light beam toward the actuator at directions varying with the position of the reference, and sensing the reflected beam direction at a position which also varies with the position of the reference.

22. The method as set forth in claim 20 above, wherein the incremental change of position of the reference is substantially greater than the corresponding incremental change of position of the transducer.

23. The method as set forth in claim 20 above, including the steps of moving the positional reference from one position to another, using the signal to position the actuator at one position after another as determined by the reference, and effecting data transfer at each position of the actuator.

24. The method as set forth in claim 23 above, further including the step of initially positioning the actuator at a home position, and varying the positions of the reference in increments relative to the home position.

25. The method of storing data at different radial positions on a rigid disk enclosed in a housing and including a magnetic head positioner rotatable about a reference axis adjacent the disk, comprising the steps of:
remotely sensing an angular position of the actuator with a light beam reflected outside the housing;
generating an electrical signal representative of the direction of the reflected light beam relative to a selected sensing position outside the housing;
varying the selected sensing position;
changing the position of the head positioner in response to the electrical signal so as to relate to the selected sensing position; and
transferring data to and from the disk with the magnetic head when the positioner is aligned with each successive sensing position.

26. The method as set forth in claim 25 above, wherein the electrical signal comprises a position error signal, and further including the step of varying the selected sensing position in increments to enable positioning information to be written in successive radial positions by the head positioner.

27. The method as set forth in claim 26 above, wherein the housing has a light transmissive window wherein the step of remote sensing comprises directing a light beam from outside the housing through the transmissive window against the head positioner and wherein the step of remotely sensing includes generating a differential signal representing the error from the selected sensing position.

28. The method as set forth in claim 27 above, wherein the step of generating a differential signal comprises sensing different parts of the beam cross-section and taking the difference between the sensed signals.

29. The method as set forth in claim 28 above, further including the step of normalizing the error signal by summing the differential outputs and adjusting the amplitude of the differential signal in response to the summed signal.

30. The method as set forth in claim 29 above, further including the step of varying the sensing position in an arc centered about the axis of rotation of the head positioner, and at a substantially greater distance than the distance between the magnetic head and the axis of rotation of the positioner.

31. The method as set forth in claim 30 above, further including the step of directing the light beam and reflecting the light beam off the head positioner along the same axis.

32. The method as set forth in claim 31 above, further including the steps of splitting off a portion of the light beam as a reference beam and directing it to a reference position, and utilizing the variation of the reference beam from the reference position to correct the differential signal for deviations in the light beam from a nominal direction.

33. The method ads set forth in claim 32 above, further including the step of initially driving the positioner to a hard stop position, externally sensing the position thereof, and using the stored value of the "home" position as a reference for the transferring of data to and from successive tracks.

34. A sealed disk drive unit having an internal dynamic mechanism and characterized by:
reflective means on the dynamic mechanism to provide a beam reflection dependent on dynamic mechanism position; and
window means in the disk drive, the window means being positioned and sized relative to the reflective means to pass the beam reflection therethrough.

35. A sealed disk drive as set forth in claim 34 above, wherein the dynamic mechanism comprises a rotary actuator and the reflective means comprises mirror means mounted on the actuator to provide a beam reflection angle dependent on actuator angular position, and wherein the window means spans the arc defined by a line perpendicular to the mirror means in travel of the actuator through its range of positions.

36. A disk drive unit as set forth in claim 35, wherein the mirror means comprises a flat mirror disposed on a side of the actuator spaced apart by a radius from the rotational axis thereof, and lying tangential to a circumference about the axis, and wherein the window means is sealed to the disk drive to maintain the seal thereof.

37. A system for externally sensing the internal position of a dynamic mechanism in a sealed disk drive unit, comprising:
   a sealed disk drive housing including window means in the housing;
   light source means for directing a small diameter light beam onto the dynamic mechanism in the disk drive through the window means to be reflected back through the window means; and
   means for sensing the position of the reflected beam to detect the position of the dynamic mechanism therein.

38. A system as set forth in claim 37 above, wherein the dynamic mechanism comprises a rotary actuator having varying angular positions and the means for sensing detects the angular position of the actuator.

39. A system as set forth in claim 37 above, wherein the dynamic mechanism comprises a rotatable disk having varying reflectivity indicia disposed at different angular positions thereon and the means for sensing detects the angular position of the disk.

40. A system for storing data, comprising:
   (a) a sealed disk drive unit comprising a rotatable medium, a magnetic head for writing and reading data on the medium, an internal actuator disposed about an axis for pivotally positioning the magnetic head in relation to the medium, a transparent window mounted in a side wall of the sealed disk drive and an internal reflective surface responsive to actuator position;
   (b) a light beam source fore generating a light beam and an image region disposed externally to the sealed disk drive unit along a path at a distance from the internal actuator;
   (c) a translator pivotably mounted upon an axis collinear with the axis of the internal actuator, wherein the translator moves to cause the light beam to be reflected off the internal reflective surface through the transparent window onto the image region in response to the angular movement of the internal actuator;
   (d) means for generating a control signal in response to the angular position of the translator, wherein the geometry between the actuator and the translator is arranged such that increments of movement of the translator are substantially greater than increments of movement of the magnetic head; and
   (e) means for adjusting the actuator position in response to the control signal to maintain the reflective surface at a predetermined relation to the image region while data transfer is effected by the magnetic head.

41. A system as set forth in claim 40 above, wherein given movement of the actuator results in predetermined displacement of the head assembly.

42. A system as set forth in claim 40 above, wherein the light beam at the image region has a small beam area, and wherein the means for generating the control signal comprises detector means for generating two detected signals varying differentially in amplitude in response to the position of the beam at the image region, and means responsive to the two detected signals for generating an error signal for controlling the actuator.

43. A system as set forth in claim 40 above, further including means for sensing the total light beam amplitude, and means responsive to the sensed amplitude for normalizing the control signal.

44. A system as set forth in claim 40 above, further including means for compensating for directional variations in the light beam.

45. A system as set forth in claim 40 above, wherein the actuator includes a shaft accessible from the exterior of the housing for securing the reflector surface to the shaft in the path of the light beam.

46. A system as set forth in claim 40 above, wherein the rotatable medium is a magnetic disk and the head assembly writes reference data to define positions on the disk.

47. A system as set forth in claim 40 above, wherein the rotatable medium is a magnetic disk and the head assembly reads or writes data at selected locations on the disk.

* * * * *

UNITED STATES PATENT AND TRADEMARK OFFICE
CERTIFICATE OF CORRECTION

PATENT NO. : 5,268,801
DATED : December 7, 1993
INVENTOR(S) : Robert L. Hazel et al.

It is certified that error appears in the above-identified patent and that said Letters Patent is hereby corrected as shown below:

Column 3, line 11, after "actuator" insert a period --.--; line 18, after "actuator" insert a period --.--. Column 9, line 59, "10,," should read --10',--; line 64, "82," should read --82'--. Column 10, line 3, after "position" insert a period --.--; line 38, after "system" insert a period --.--. Column 13, line 22, "alight" should read --a light--; line 32, after "the" (first occurrence) "side" should read --disk--. Column 14, line 41, after "method" "ads" should read --as--. Column 15, line 32, after "source" "fore" should read --for--.

Signed and Sealed this

Fourteenth Day of June, 1994

Attest:

BRUCE LEHMAN

*Attesting Officer*     *Commissioner of Patents and Trademarks*